United States Patent
Onizuka

(10) Patent No.: US 8,911,155 B2
(45) Date of Patent: Dec. 16, 2014

(54) CAGE FOR THRUST ROLLER BEARING

(71) Applicant: JTEKT Corporation, Osaka-shi, Osaka (JP)

(72) Inventor: Takaaki Onizuka, Kashiwara (JP)

(73) Assignee: JTEKT Corporation, Osaka (JP)

(*) Notice: Subject to any disclaimer, the term of this patent is extended or adjusted under 35 U.S.C. 154(b) by 0 days.

(21) Appl. No.: 14/068,567

(22) Filed: Oct. 31, 2013

(65) Prior Publication Data
US 2014/0126852 A1 May 8, 2014

(30) Foreign Application Priority Data
Nov. 7, 2012 (JP) ................................. 2012-245542

(51) Int. Cl.
*F16C 33/46* (2006.01)
*F16C 33/54* (2006.01)

(52) U.S. Cl.
CPC ........... *F16C 33/4676* (2013.01); *F16C 33/546* (2013.01)
USPC ....................................................... 384/623

(58) Field of Classification Search
CPC .. F16C 33/46; F16C 33/4617; F16C 33/4623; F16C 33/4629; F16C 33/467; F16C 33/4676; F16C 33/54; F16C 33/541; F16C 33/542; F16C 33/543; F16C 33/545; F16C 33/546
USPC .................................................. 384/621, 623
See application file for complete search history.

(56) References Cited

FOREIGN PATENT DOCUMENTS

DE        GB 1279750 A   *   6/1972
JP         A-2008-202797         9/2008

* cited by examiner

*Primary Examiner* — Phillip A Johnson
(74) *Attorney, Agent, or Firm* — Oliff PLC

(57) ABSTRACT

A cage bar of at least one of pockets, the cage bar being on one side of the at least one of the pockets in the circumferential direction, has a bent portion that is bent toward one side in an axial direction such that an end face of the cage bar on the other side in the axial direction is recessed toward the one side in the axial direction. Further, a cage bar of the at least one of the pockets, the cage bar being on the other side of the at least one of the pockets in the circumferential direction, has a bent portion that is bent toward the other side in the axial direction such that an end face of the cage bar on the one side in the axial direction is recessed toward the other side in the axial direction.

1 Claim, 5 Drawing Sheets

CAGE FOR THRUST ROLLER BEARING

INCORPORATION BY REFERENCE

The disclosure of Japanese Patent Application No. 2012-245542 filed on Nov. 7, 2012 including the specification, drawings and abstract, is incorporated herein by reference in its entirety.

BACKGROUND OF THE INVENTION

1. Field of the Invention

The invention relates to a cage for a thrust roller bearing.

2. Description of Related Art

A conventional cage for a thrust roller bearing (hereinafter, simply referred to as "thrust cage") is described in, for example, Japanese Patent Application Publication No. 2008-202797 (JP 2008-202797 A). The thrust cage has a large-diameter annular portion, a small-diameter annular portion and a plurality of cage bars. The large-diameter annular portion and the small-diameter annular portion are concentric with each other, and are located on substantially the same plane. The cage bars connect the large-diameter annular portion and the small-diameter annular portion to each other. The cage bars are arranged at intervals in the circumferential direction of the small-diameter annular portion.

Each of the cage bars is bent into a generally U-shape in the axial direction of the small-diameter annular portion, as viewed in a section taken along the radial direction of the thrust cage. Further, all the cage bars are bent toward the same side in the axial direction of the small-diameter annular portion. In the above-described conventional thrust cage, the cage bars are bent into a generally U-shape, so that the thrust cage has an enhanced roller retaining capability.

However, because the cage bars of the above-described thrust cage are bent into a generally U-shape in the axial direction, the radial load bearing capacity of the above-described thrust cage is lower than that of a thrust cage having cage bars that are not bent. Therefore, there has been a demand that local deformation of the thrust cage, which is caused by holding the thrust cage between an inner ring and an outer ring, should be further suppressed, and the stiffness of the thrust cage against a radial compressive load should be enhanced.

SUMMARY OF THE INVENTION

One object of the invention is to provide a cage for a thrust roller bearing, configured such that local deformation of the cage, which is caused by holding the cage between an inner ring and an outer ring, is suppressed and the stiffness of the cage against a radial compressive load is enhanced, while the roller retaining capability of the cage is appropriately maintained.

An aspect of the invention relates to a cage for a thrust roller bearing, including: a first annular portion; and a plurality of cage bars extended from the first annular portion in a radial direction of the first annular portion, and located at intervals in a circumferential direction of the first annular portion. The cage has pockets formed between the cage bars that are adjacent to each other in the circumferential direction, rollers being arranged in the pockets. The cage bar of at least one of the pockets, the cage bar being on one side of the at least one of the pockets in the circumferential direction, has a bent portion that is bent toward one side in an axial direction such that an end face of the cage bar on the other side in the axial direction is recessed toward the one side in the axial direction. The cage bar of the at least one of the pockets, the cage bar being on the other side of the at least one of the pockets in the circumferential direction, has a bent portion that is bent toward the other side in the axial direction such that an end face of the cage bar on the one side in the axial direction is recessed toward the other side in the axial direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
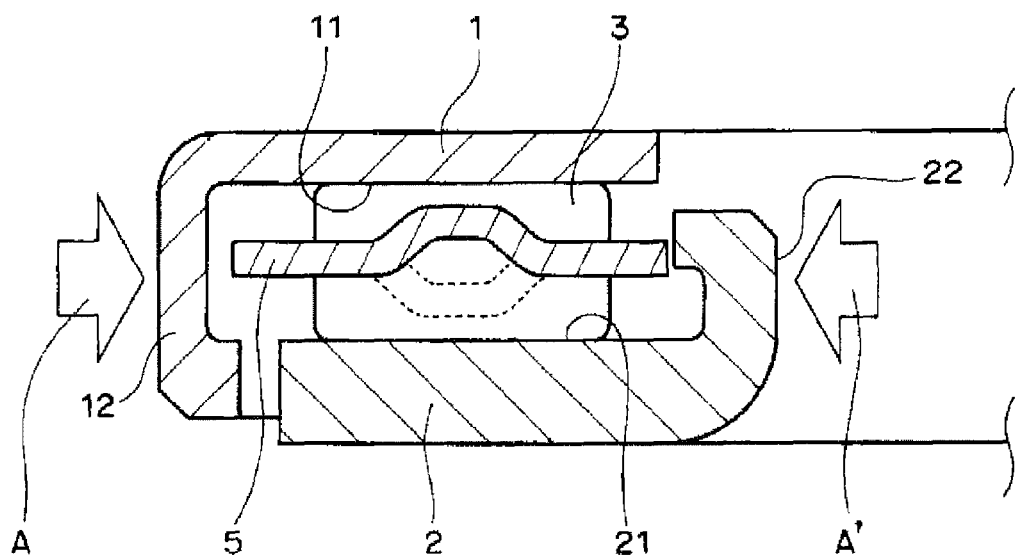
FIG. 1 is a schematic sectional view illustrating a thrust cylindrical roller bearing according to a first embodiment of the invention, taken along the radial direction of the thrust cylindrical roller bearing.

FIG. 1 is a schematic sectional view illustrating a thrust cylindrical roller bearing according to a first embodiment of the invention, taken along the radial direction of the thrust cylindrical roller bearing.

The thrust cylindrical roller bearing includes an outer ring 1, an inner ring 2, a plurality of cylindrical rollers 3 and a cage 5 for a thrust cylindrical roller bearing (hereinafter, simply referred to as "thrust cage"). The outer ring 1 has a disc shape, and has a flat raceway surface 11. Further, the outer ring 1 has a bent extended portion 12. The bent extended portion 12 is located at a radially outer end portion of the outer ring 1. The bent extended portion 12 has a shape formed by bending a radially outer end portion of the outer ring 1 toward one side in the axial direction and is then extended along the axial direction toward the one side in the axial direction.

The inner ring 2 has a disc shape, and has a flat raceway surface 21. The raceway surface 21 of the inner ring 2 is opposed to the raceway surface 11 of the outer ring 1 in the axial direction. The inner ring 2 has a bent extended portion 22. The bent extended portion 22 is located at a radially inner end portion of the inner ring 2. The bent extended portion 22 has a shape formed by bending a radially inner end portion of the inner ring 2 toward the other side in the axial direction and is then extended along the axial direction toward the other side in the axial direction.

The cylindrical rollers 3 are arranged at intervals in the circumferential direction, while being retained, by thrust cage 5, between the raceway surface 11 of the outer ring 1 and the raceway surface 21 of the inner ring 2. The thrust cage 5 is made of a steel material that can be press-formed, for example, a cold-rolled steel (SPCC), carbon steels for machine structural use (S45C), or a general purpose stainless steel, and is formed by press-forming. The thrust cage 5 is overlapped with both the bent extended portion 12 of the outer ring 1 and the bent extended portion 22 of the inner ring 2 in the radial direction, so that the thrust cage 5 is prevented from coming off the outer ring 1 and the inner ring 2 in the radial direction.

Figure 2:
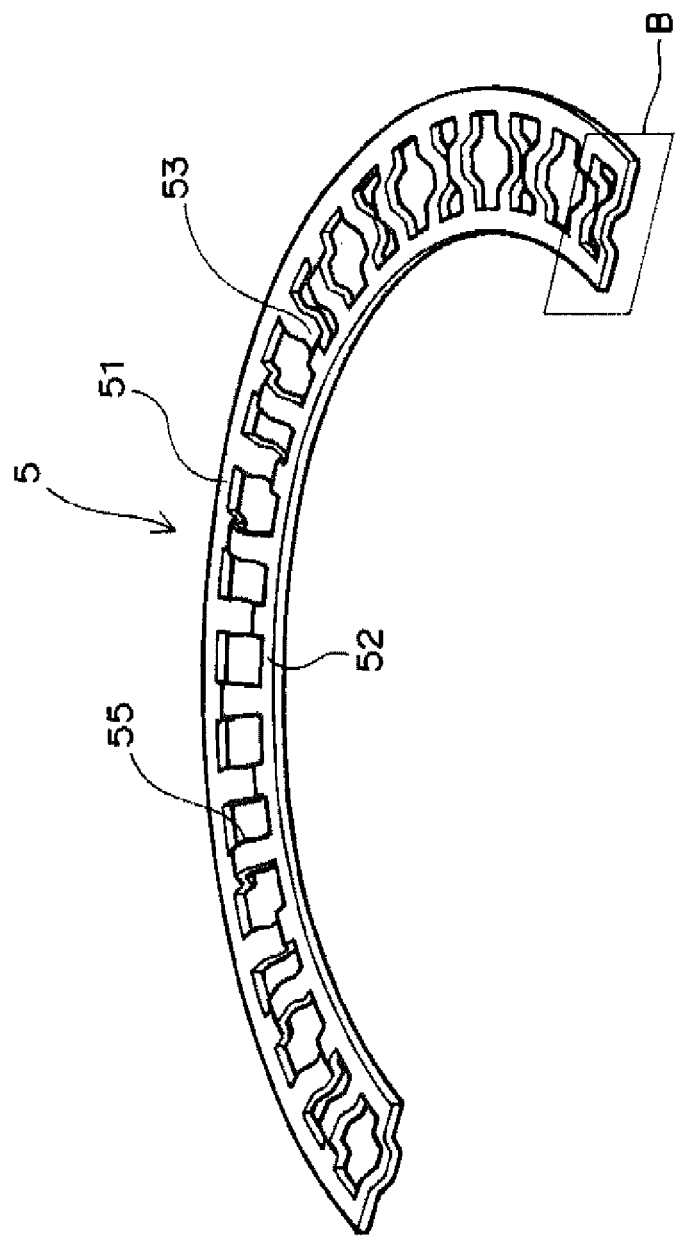
FIG. 2 is a perspective view illustrating part of a thrust cage in FIG. 1, as viewed from one side in the axial direction of the thrust cage.

FIG. 2 is a perspective view illustrating part of the thrust cage 5, as viewed from one side in the axial direction of the thrust cage 5.

As illustrated in FIG. 2, the thrust cage 5 has a large-diameter annular portion 51, which may function as a first annular portion, a small-diameter annular portion 52, which may function as a second annular portion, and a plurality of cage bars 53. The large-diameter annular portion 51 and the small-diameter annular portion 52 are flat, and are located on substantially the same plane. The large-diameter annular portion 51 and the small-diameter annular portion 52 are concentric with each other, and are located on substantially the same plane. The large-diameter annular portion 51 is located radially outward of the small-diameter annular portion 52. The cage bars 53 connect the large-diameter annular portion 51 with the small-diameter annular portion 52. The cage bars 53 are arranged at intervals in the circumferential direction of the small-diameter annular portion 52.

The thrust cage 5 has 2N (N is a natural number) pockets 55. The pockets 55 are positioned between the cage bars 53 that are adjacent to each other in the circumferential direction. The cylindrical rollers 3 are arranged in the pockets 55. As illustrated in FIG. 2, each of the cage bars 53 has substantially the same thickness at any positions in the radial direction. Each of the cage bars 53 is bent in the axial direction such that an end face of the cage bar 53 on one side in the axial direction has a generally isosceles trapezoid-shaped recessed portion, as viewed in a section taken along the radial direction. As illustrated in FIG. 2, any two of the cage bars 53 that are adjacent to each other in the circumferential direction are bent toward opposite sides in the axial direction. As a result, the cage bars 53 that are bent toward one side in the axial direction and the cage bars 53 that are bent toward the other side in the axial direction are alternately arranged in the circumferential direction.

Figure 3:
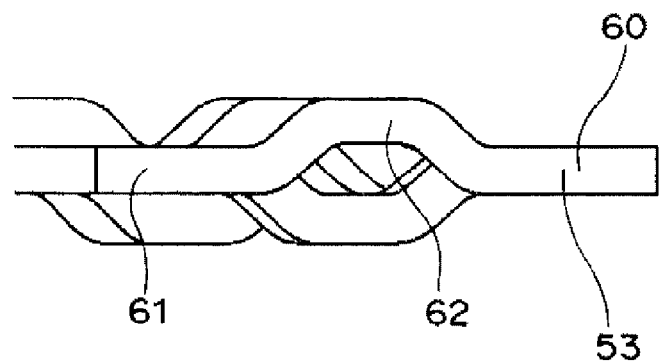
FIG. 3 is a perspective view illustrating a cut section in the radial direction, indicated by a reference character B in FIG. 2, and its surroundings, as viewed from the outside in the circumferential direction in FIG. 2.

FIG. 3 is a perspective view illustrating a cut section in the radial direction, indicated by a reference character B in FIG. 2, and its surroundings, as viewed from the outside in the circumferential direction in FIG. 2.

As illustrated in FIG. 3, each of the cage bars 53 has a large diameter-side connection portion 60 and a small diameter-side connection portion 61, in addition to a bent portion 62. The large diameter-side connection portion 60 is connected to the large-diameter annular portion 51, and is extended radially inward from a radially inner end face of the large-diameter annular portion 51. The small diameter-side connection portion 61 is connected to the small-diameter annular portion 52, and is extended radially outward from a radially outer end face of the small-diameter annular portion 52. The large diameter-side connection portion 60 and the small diameter-side connection portion 61 are both flat. The bent portion 62 is located at the center of each of the cage bars 53 in the radial direction. A radially outer end portion of the bent portion 62 is connected to a radially inner end portion of the large diameter-side connection portion 60. A radially inner end portion of the bent portion 62 is connected to a radially outer end portion of the small diameter-side connection portion 61.

As illustrated in FIG. 3, all the large diameter-side connection portions 60 of the cage bars 53 are overlapped with each other in the circumferential direction, and all the small diameter-side connection portions 61 of the cage bars 53 are also overlapped with each other in the circumferential direction. N (N is a natural number) cage bars 53, which are bent toward one side in the axial direction and which alternate with the cage bars 53 bent toward the other side in the axial direction, are overlapped with each other in the circumferential direction. Further, N (N is natural number) cage bars 53, which are bent toward the other side in the axial direction and which alternate with the cage bars 53 bent toward the one side in the axial direction, are also overlapped with each other in the circumferential direction.

Figure 4:
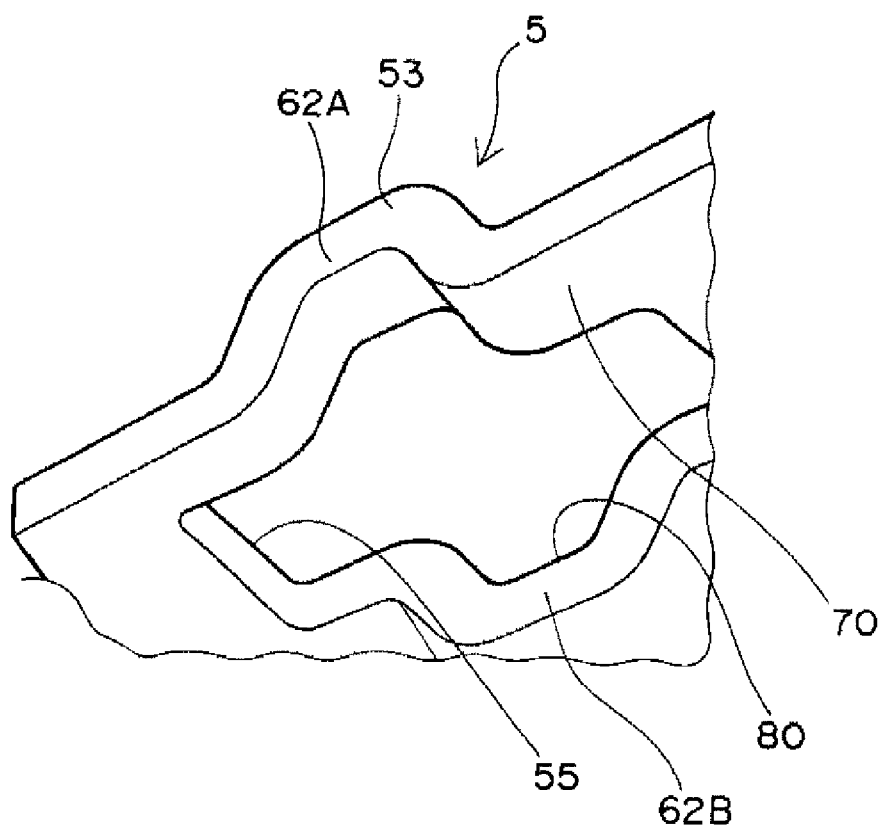
FIG. 4 is a perspective view illustrating a portion of the thrust cage in FIG. 3, around one pocket of the thrust cage.

FIG. 4 is a perspective view illustrating a portion of the thrust cage 5 in FIG. 3, around one pocket 55 of the thrust cage 5.

As illustrated in FIG. 4, the cage bar 53 on one side of the pocket 55 in the circumferential direction has a bent portion 62A that is bent toward the other side in the axial direction such that an end face 70 of the cage bar 53 on one side in the axial direction is recessed toward the other side in the axial direction. Further, the cage bar 53 on the other side of the pocket 55 in the circumferential direction has a bent portion 62B that is bent toward the one side in the axial direction such that an end face 80 of the cage bar 53 on the other side in the axial direction is recessed toward the one side in the axial direction. Note that, it is needless to say that the 2N bent portions 62 of the thrust cage 5 has N bent portions 62A and N bent portions 62B.

According to the first embodiment described above, at each pocket 55, the cage bar 53 on one side of the pocket 55 in the circumferential direction and the cage bar 53 on the other side of the pocket 55 in the circumferential direction are bent in the axial direction. Thus, it is possible to enhance the thrust cage's capability of retaining the cylindrical rollers 3 in the pockets 55.

According to the first embodiment described above, the thrust cage 5 has at least two cage bars 53 that are bent toward the opposite sides in the axial direction, and the cage bars 53 that are bent toward one side in the axial direction and the cage bars 53 that are bent toward the other side in the axial direction are alternately arranged and located adjacent to each other in the circumferential direction. Thus, the mass balance of the thrust cage 5 in the axial direction is better than that in a conventional thrust cage in which all the cage bars are bent toward the same side in the axial direction. Therefore, as compared with the conventional thrust cage, the stiffness of the thrust cage 5 in each of the axial direction and the radial direction is enhanced, the stiffness of the thrust cage 5 against radial compressive loads as indicated by arrows AA' in FIG. 1 is enhanced, and local deformation of the thrust cage 5, which is caused by holding the thrust cage 5 between the outer ring 1 and the inner ring 2, is suppressed.

Further, according to the first embodiment described above, because the mass balance of the thrust cage 5 in the axial direction is improved, the behavior of the thrust cage 5 is stabilized.

In the first embodiment described above, because each of the cage bars 53 has the bent portion 62 that is bent in the axial direction, the bent portion 62 may have a lug that protrudes in the circumferential direction and that is used to prevent the cylindrical roller 3 from coming off. In the case where each bent portion 6 is provided with the lug for preventing the cylindrical roller 3 from coming off, a subassembly formed of the thrust cage 5 and a plurality of the cylindrical rollers 3 is prepared. This makes it possible to facilitate, for example, the conveyance of the cylindrical roller bearing, and to reliably retain the cylindrical rollers 3 with the use of the thrust cage 5.

In the first embodiment described above, at each of all the pockets 55, the cage bar 53 on one side of the pocket 55 in the circumferential direction has the bent portion 62A that is bent toward the other side in the axial direction such that the end face 70 of the cage bar 53 on one side in the axial direction is recessed toward the other side in the axial direction. Further, the cage bar 53 on the other side of the pocket 55 in the circumferential direction has the bent portion 62B that is bent toward the one side in the axial direction such that the end face 80 of the cage bar 53 on the other side in the axial direction is recessed toward the one side in the axial direction. However, the thrust cage according to the invention may be configured such that, at at least one of the pockets, the cage bar on one side of the pocket in the circumferential direction has the bent portion that is bent toward the other side in the axial direction such that the end face of the cage bar on one side in the axial direction is recessed toward the other side in the axial direction, and the cage bar on the other side of the pocket in the circumferential direction has the bent portion that is bent toward the one side in the axial direction such that the end face of the cage bar on the other side in the axial direction is recessed toward the one side in the axial direction.

Further, in the first embodiment described above, the thrust cage 5 has an even number of pockets 25. However, the thrust cage according to the invention may have an odd number of pockets. It is needless to say that, in the case where the thrust cage has an odd number of pockets, if all the cage bars have the bent portions, at at least one of the pockets, the two cage bars that define the pocket are bent toward the same side in the axial direction.

In the first embodiment described above, the recessed portion formed in each of the cage bars 53 has an isosceles trapezoidal shape. However, the recessed portion formed in each of the cage bars may have a shape other than the isosceles trapezoidal shape, such as a substantially rectangular shape or a substantially semi-circular shape.

In the first embodiment described above, the thrust cage 5 is made of a steel material. However, the thrust cage may be made of a resin material, and may be formed by, for example, injection molding.

In the first embodiment described above, the rollers are cylindrical rollers (needle rollers or other cylindrical rollers) 3. However, the rollers may be tapered rollers or convex rollers (spherical rollers).

Figure 5:
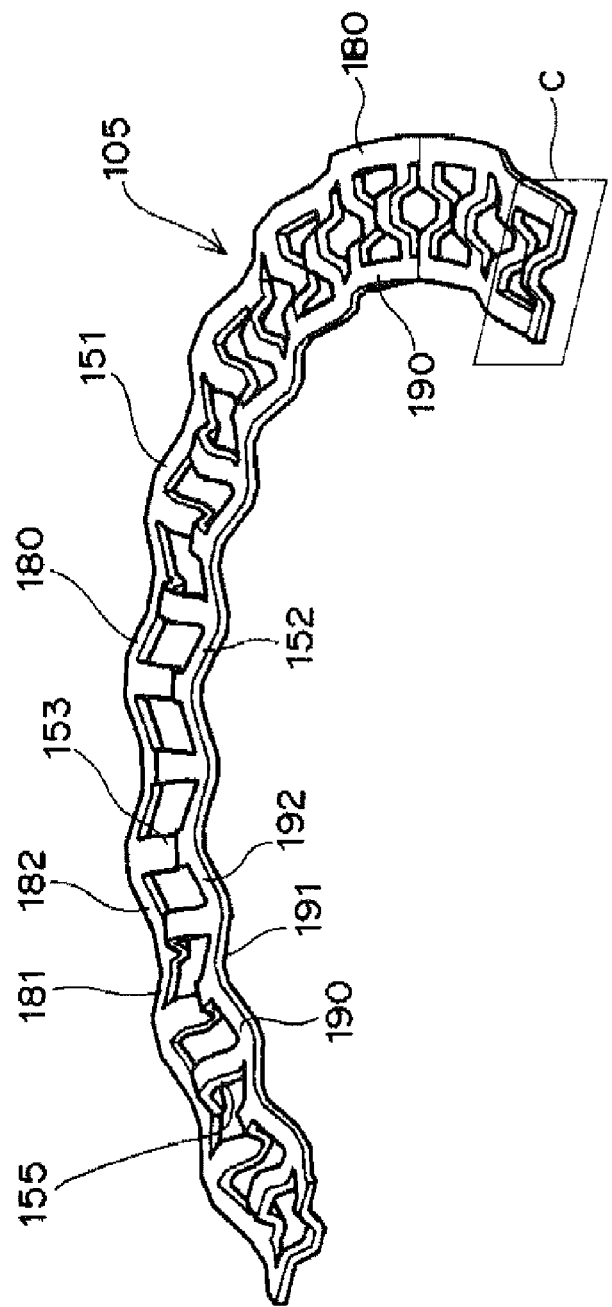
FIG. 5 is a view illustrating a thrust cage according to a second embodiment of the invention, which corresponds to FIG. 2.

FIG. 5 is a view corresponding to FIG. 2 and illustrating a thrust cage 105 according to a second embodiment of the invention.

The thrust cage 105 in the second embodiment has an even number of pockets 155, like the thrust cage 5 in the first embodiment. The thrust cage 105 in the second embodiment differs from the thrust cage 5 in the first embodiment, in that a large-diameter annular portion 151 and a small-diameter annular portion 152 are both corrugated in a cycle of the same phase angle. In the second embodiment, descriptions on the same structures as those in the first embodiment, such as the structure that cage bars 153 have recessed portions, will be omitted, and the advantageous effects as those in the first embodiment will also be omitted. Further, in the second embodiment, descriptions on the same modified examples as those in the first embodiments will also be omitted.

The thrust cage 105 in the second embodiment is made of a steel material that is can be press-formed, and is formed by press-forming. As illustrated in FIG. 5, the large-diameter annular portion 151 has such a shape that the large-diameter annular portion 151 extends in a zigzag manner, like a generally polygonal line, between a first axial position and a second axial position. The large-diameter annular portion 151 has 2M (M is a natural number) inter-cage bar portions 180 located between the cage bars 153 that are adjacent to each other in the circumferential direction. Among the 2M inter-cage bar portions 180, M inter-cage bar portions 180 that alternate with the other inter-cage bar portions 180, respectively have one axial side inclined portions 181 which are inclined toward one side in the axial direction, in a direction toward one side in the circumferential direction. The inter-cage bar portions 180, which are respectively adjacent to the aforementioned M inter-cage bar portions 180 on one side in the circumferential direction, have the other axial side inclined portions 182 which are inclined toward the other side in the axial direction, in the direction toward the one side in the circumferential direction.

Similarly, the small-diameter annular portion 152 has such a shape that the small-diameter annular portion 152 extends in a zigzag manner, like a generally polygonal line, between a first axial position and a second axial position. The small-diameter annular portion 152 has 2M (M is a natural number) inter-cage bar portions 190 located between the cage bars 153 that are adjacent to each other in the circumferential direction. Among the 2M inter-cage bar portions 190, M inter-cage bar portions 190 that alternate with the other inter-cage bar portions 190, respectively have one axial side inclined portions 191 which are inclined toward the one side in the axial direction, in the direction toward the one side in the circumferential direction. The inter-cage bar portions 190, which are respectively adjacent to the aforementioned M inter-cage bar portions 190 on the one side in the circumferential direction, have the other axial side inclined portions 192 which are inclined toward the other side in the axial direction, in the direction toward the one side in the circumferential direction.

Figure 6:
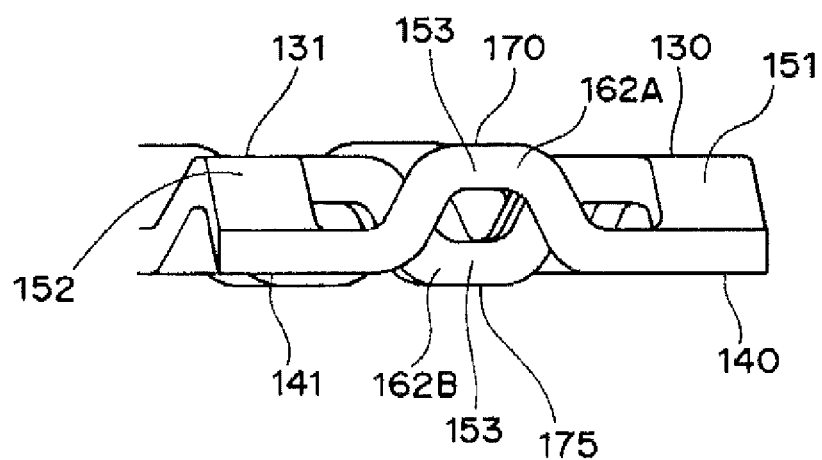
FIG. 6 is a perspective view illustrating a cut section in the radial direction, indicated by a reference character C in FIG. 5, and its surroundings, as viewed from the outside in the circumferential direction in FIG. 5.

FIG. 6 is a perspective view illustrating a cut section in the radial direction, indicated by a reference character C in FIG. 5, and its surroundings, as viewed from the outside in the circumferential direction in FIG. 5.

As illustrated in FIG. 6, the axial positions of portions 130, 131 of the large-diameter annular portion 151 and the small-diameter annular portion 152 substantially coincide with the axial position of a portion 170 of a bent portion 162A of the cage bar 153 extended from portions 140, 141 of the large-diameter annular portion 151 and the small-diameter annular portion 152. The portions 130, 131 are located on one side in the axial direction, and are located at positions farthest from the other side in the axial direction within the annular portions 151, 152. The portions 140, 141 are located on the other side in the axial direction, and are located at positions farthest from the one side in the axial direction within the annular portions 151, 152. The portion 170 is located on the one side in the axial direction, and is located at a position farthest from the other side in the axial direction within the bent portion 162A.

On the other hand, the axial positions of the portions 140, 141 of the large-diameter annular portion 151 and the small-diameter annular portion 152 substantially coincide with the axial position of a portion 175 of a bent portion 162B of the cage bar 153 extended from the portions 130, 131 of the large-diameter annular portion 151 and the small-diameter annular portion 152. The portions 140, 141 are located on the other side in the axial direction, and are located at positions farthest from the one side in the axial direction within the annular portions 151, 152. The portions 130, 131 are located on the one side in the axial direction, and are located at positions farthest from the other side in the axial direction within the annular portions 151, 152. The portion 175 is located on the other side in the axial direction, and is located at a position farthest from the one side in the axial direction within the bent portion 162B.

Further, as illustrated in FIG. 6, the axial position of a portion of the bent portion 162A, the portion being on the one side in the axial direction and being located farthest from the other side in the axial direction within the bent portion 162A, which is bent from the axial positions of the large-diameter annular portion 151 and the small-diameter annular portion 152, the axial positions being on the other side in the axial direction and being located farthest from the one side in the axial direction, toward the one side in the axial direction, is offset toward the one side in the axial direction from the axial position of a portion of the bent portion 162B, the portion being on the other side in the axial direction and being located farthest from the one side in the axial direction within the bent portion 162B, which is bent from the axial positions of the large-diameter annular portion 151 and the small-diameter annular portion 152, the axial positions being on the one side in the axial direction and being located farthest from the other side in the axial direction.

According to the second embodiment described above, the large-diameter annular portion 151 has axially inclined portions 181, 182 that are alternately arranged in the circumferential direction and that are inclined toward the opposite sides in the axial direction. Further, the small-diameter annular portion 152 has axially inclined portions 191, 192 that are alternately arranged in the circumferential direction and that are inclined toward the opposite sides in the axial direction. Thus, the stiffness of the thrust cage 105 in each of the axial direction and the radial direction is further increased, and local deformation of the thrust cage 105, which is caused by holding the thrust cage 105 between the inner ring and the outer ring, is further reliably suppressed.

According to the second embodiment described above, both the large-diameter annular portion 151 and the small-diameter annular portion 152 are corrugated in the axial direction. Thus, in the case where the cage bars 153 are provided with lugs that protrude in the circumferential direction and that are used to retain the rollers, more lugs can be located at different axial positions. Thus, in the case of forming, in the thrust cage 105, the lugs for preventing the rollers from coming off, the rollers can be retained in a more stable manner.

In the second embodiment described above, the inter-cage bar portions 180, 190 of the annular portions 151, 152 are inclined toward the respective sides in the axial direction, in the direction toward the one side in the circumferential direction, over the entire region in the circumferential direction, where the inter-cage bar portions 180, 190 are provided. However, the inter-cage bar portions of at least one of the annular portions 151, 152 may be inclined toward the respective sides in the axial direction, in the direction toward the one side in the circumferential direction, over only part of the region in the circumferential direction, where the inter-cage bar portions are provided.

In the second embodiment described above, the large-diameter annular portion 151 and the small-diameter annular portion 152 respectively have an even number of the inter-cage bar portions 180 and an even number of the inter-cage bar portions 190, each of all the inter-cage bar portions 180 is the inclined portion 181 or the inclined portion 182, each of all the inter-cage bar portions 190 is the inclined portion 191 or the inclined portion 192, and the large-diameter annular portion 151 and the small-diameter annular portion 152 are have corrugated shapes. However, each of the large-diameter annular portion and the small-diameter annular portion may have an odd number of the inter-cage bar portions. In this case, there may be at least one inter-cage bar portion that is not inclined in the axial direction. Alternatively, each of the large-diameter annular portion and the small-diameter annular portion may have an even number of the inter-cage bar portions. In this case, there may be at least one inter-cage bar portion that is not inclined in the axial direction.

In the second embodiment described above, the large-diameter annular portion 151 and the small-diameter annular portion 152 are both corrugated like a generally polygonal line. However, the large-diameter annular portion and the small-diameter annular portion may be both corrugated such that the large-diameter annular portion and the small-diameter annular portion are curved.

According to the invention, it is possible to provide the cage for a thrust roller bearing, configured such that local deformation of the cage, which is caused by holding the cage between the inner ring and the outer ring, is suppressed and the stiffness of the cage against a radial compressive load is enhanced, while the roller retaining capability of the cage is appropriately maintained.

What is claimed is:

1. A cage for a thrust roller bearing, the cage comprising:
    a first annular portion;
    a plurality of cage bars configured to extend from the first annular portion in a radial direction of the first annular portion, and located at intervals in a circumferential direction of the first annular portion;
    a second annular portion opposed to the first annular portion in the radial direction, and connected to the first annular portion by the plurality of cage bars; and
    a plurality of pockets disposed between the plurality of cage bars and being adjacent to each other in the circumferential direction, wherein:
    a first cage bar of the plurality of cage bars disposed on one side of at least one of the pockets includes a bent portion that is bent toward one side in an axial direction such that an end face of the first cage bar on the other side in the axial direction is recessed toward the one side in the axial direction,
    a second cage bar of the plurality of cage bars disposed on the other side of the at least one of the pockets includes a bent portion that is bent toward the other side in the axial direction such that an end face of the second cage bar on the one side in the axial direction is recessed toward the other side in the axial direction,
    each of the first annular portion and the second annular portion includes inter-cage bar portions located between the plurality of cage bars adjacent to each other in the circumferential direction,
    at least one of the inter-cage bar portions includes a one axial side inclined portion inclined toward one side in the axial direction, in a direction toward the one side in the circumferential direction, and
    the inter-cage bar portion adjacent to the at least one of the inter-cage bar portions on the one side in the circumferential direction includes an other axial side inclined portion inclined toward the other side in the axial direction, in the direction toward the one side in the circumferential direction.

* * * * *